(12) United States Patent
Kochura et al.

(10) Patent No.: US 12,248,752 B2
(45) Date of Patent: Mar. 11, 2025

(54) PRIMARY TOPIC IDENTIFICATION IN TEXT DATA

(71) Applicant: International Business Machines Corporation, Armonk, NY (US)

(72) Inventors: Nadiya Kochura, Bolton, MA (US); Fang Lu, Billerica, MA (US); Kelley Anders, East New Market, MD (US); Jonathan D. Dunne, Dungarvan (IE)

(73) Assignee: International Business Machines Corporation, Armonk, NY (US)

(*) Notice: Subject to any disclaimer, the term of this patent is extended or adjusted under 35 U.S.C. 154(b) by 248 days.

(21) Appl. No.: 17/303,231

(22) Filed: May 25, 2021

(65) Prior Publication Data

US 2022/0382986 A1    Dec. 1, 2022

(51) Int. Cl.
*G06F 40/30* (2020.01)
*G06F 40/194* (2020.01)
*H04L 51/02* (2022.01)

(52) U.S. Cl.
CPC ............ *G06F 40/30* (2020.01); *G06F 40/194* (2020.01); *H04L 51/02* (2013.01)

(58) Field of Classification Search
CPC ........ G06F 40/00; G06F 40/30; G06F 40/194; H04L 51/00; H04L 51/02
See application file for complete search history.

(56) References Cited

U.S. PATENT DOCUMENTS

| | | | |
|---|---|---|---|
| 8,930,388 B2 | 1/2015 | Stefik | |
| 9,262,531 B2 | 2/2016 | Ferren | |
| 9,489,657 B2 | 11/2016 | Chudge | |
| 10,601,753 B2 | 3/2020 | Draeger | |
| 10,977,446 B1* | 4/2021 | Anaya | G06F 40/30 |
| 2005/0144228 A1* | 6/2005 | Rokosz | G06Q 10/107 709/204 |
| 2012/0166179 A1* | 6/2012 | Tirumalachetty | G06F 40/258 704/E11.001 |
| 2015/0350139 A1* | 12/2015 | Speer | G06F 16/3344 709/206 |
| 2017/0032021 A1 | 2/2017 | Watanachote | |

(Continued)

FOREIGN PATENT DOCUMENTS

| | | |
|---|---|---|
| EP | 35438741 A | 9/2019 |
| KR | 1019583771 A | 12/2018 |
| WO | 2005098701 A2 | 10/2005 |

OTHER PUBLICATIONS

Vo-Trung, Hung. "Development of a Document Classification Method by Using Geodesic Distance to Calculate Similarity of Documents." Eastern-European Journal of Enterprise Technologies, vol. 4, No. 2, 2020, pp. 25-32, doi:10.15587/1729-4061.2020.203866. (Year: 2020).*

(Continued)

*Primary Examiner* — Daniel C Washburn
*Assistant Examiner* — Sean E Serraguard
(74) *Attorney, Agent, or Firm* — Daniel J Blabolil

(57) ABSTRACT

An approach for directing a chat agent for an online discussion is provided. A processor retrieves message data from a messaging program. A processor identifies at least one topic present in the message data. A processor, responsive to a determination that the at least one topic is a primary topic, updates the chat agent with the primary topic. A processor modifies message data based on the determined primary topic.

18 Claims, 5 Drawing Sheets

(56) References Cited

U.S. PATENT DOCUMENTS

| | | | |
|---|---|---|---|
| 2017/0351385 A1 | 12/2017 | Ertmann | |
| 2020/0057808 A1* | 2/2020 | Dunne | H04L 51/046 |
| 2020/0293618 A1* | 9/2020 | Chhabra | G06Q 10/10 |
| 2021/0089623 A1* | 3/2021 | Guidotti | G06F 40/30 |
| 2021/0240935 A1* | 8/2021 | Galitsky | G06F 40/30 |
| 2021/0256534 A1* | 8/2021 | An | G06F 40/216 |
| 2022/0351142 A1* | 11/2022 | McGarr | H04L 51/216 |

OTHER PUBLICATIONS

Walkowiak, T., Gniewkowski, M., Distance measures for clustering of documents in a topic space. In Engr. in Dependability of Comp. Sys. and Ntwrk.: Proc. of the 14th Intl. Conf. on Dependability of Comp. Sys. DepCoS-RELCOMEX, Jul. 1-5, 2019, Brunów, Poland (pp. 544-552) (Year: 2020).*

* cited by examiner

PRIMARY TOPIC IDENTIFICATION IN TEXT DATA

The present invention relates generally to the field of natural language processing, and more particularly to identifying primary topics being discussed in text.

Natural language processing (NLP) is a subfield of linguistics, computer science, and artificial intelligence concerned with the interactions between computers and human language, in particular how to program computers to process and analyze large amounts of natural language data. The result is a computer capable of "understanding" the contents of documents, including the contextual nuances of the language within them. The technology can then accurately extract information and insights contained in the documents as well as categorize and organize the documents themselves.

SUMMARY

Embodiments of the present invention provide a method, system, and program product to direct a chat agent for an online discussion. A processor retrieves message data from a messaging program. A processor identifies at least one topic present in the message data. A processor, responsive to a determination that the at least one topic is a primary topic, updates the chat agent with the primary topic. A processor modifies message data based on the determined primary topic.

DETAILED DESCRIPTION

Figure 1:
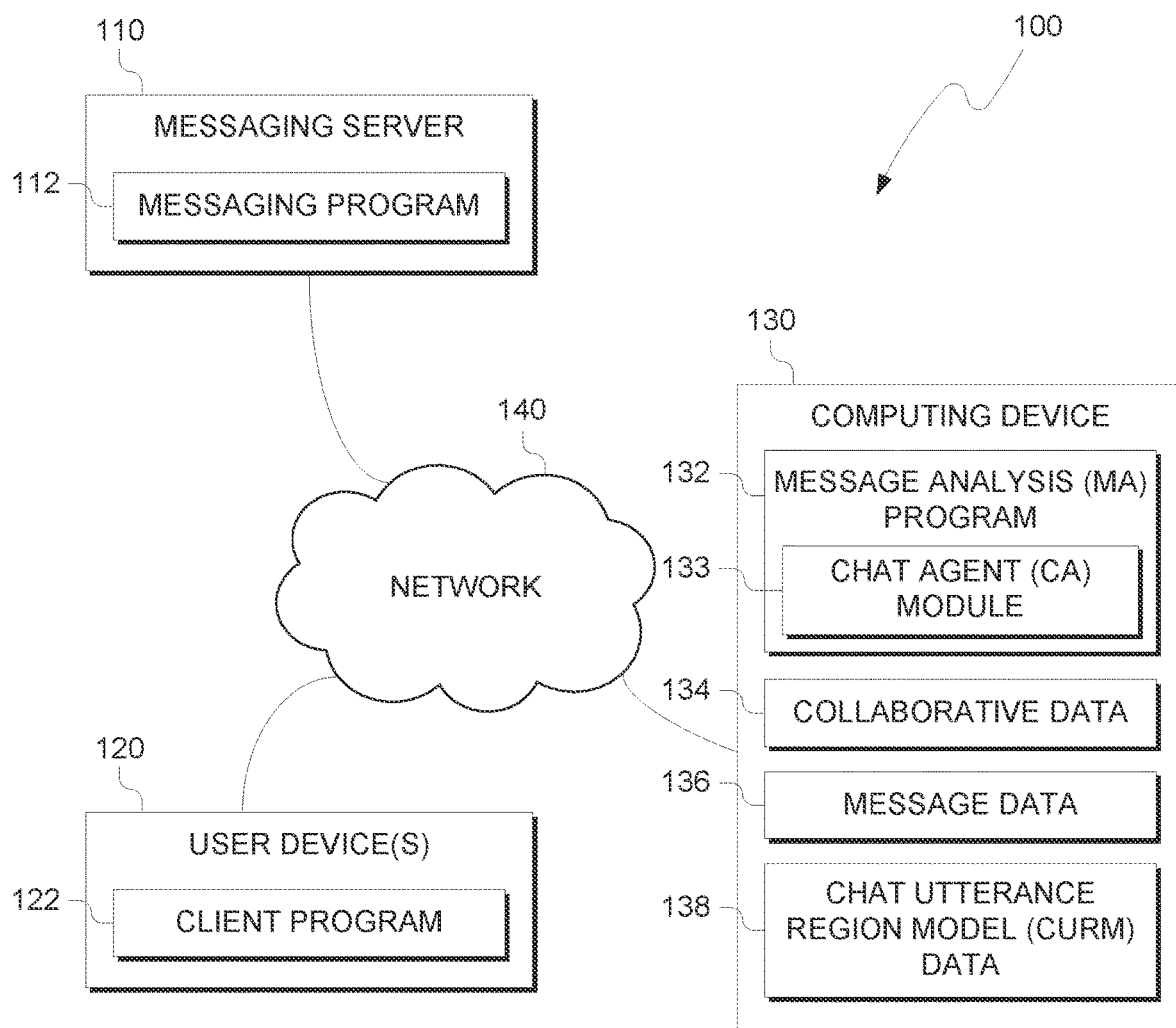
FIG. 1 is a functional block diagram illustrating a networked environment, in accordance with an exemplary embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes messaging server 110, user device(s) 120 and computing device 130 connected over network 140. Messaging server 110 includes messaging program 112. User device(s) 120 include client program 122. Computing device 130 includes messaging analysis (MA) program 132, chat agent (CA) module 133, collaborative data 134, message data 136 and chat utterance region model (CURM) data 138.

In various embodiments of the present invention, messaging server 110, user devices 120 and computing device 130 are each a computing device that can be a standalone device, a server, a laptop computer, a tablet computer, a netbook computer, a personal computer (PC), or a desktop computer. In another embodiment, messaging server 110, user devices 120 and computing device 130, either individually or collectively, represent a computing system utilizing clustered computers and components to act as a single pool of seamless resources. In general, messaging server 110, user devices 120 or computing device 130 can be any computing device or a combination of devices with access to collaborative data 134, message data 136 and CURM data 138 and is capable of executing messaging program 112, client program 122, MA program 132, or CA module 133. Messaging server 110, user devices 120 and computing device 130 may include internal and external hardware components, as depicted and described in further detail with respect to FIG. 4.

In this exemplary embodiment, messaging program 112 is stored on messaging server 110; client program 122 is stored on a respective user device 120; and MA program 132, CA module 133, collaborative data 134, message data 136 and CURM data 138 are stored on computing device 130. However, in other embodiments, messaging program 112, client program 122, MA program 132, CA module 133, collaborative data 134, message data 136 and CURM data 138 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between messaging server 110, user device(s) 120 and computing device 130, in accordance with a desired embodiment of the present invention.

In various embodiments, messaging server 110 provides various function and routines to provide a messaging or communication platform between users. Messaging program 112 collects and distributes various messages sent by user to the intended or relevant recipients. User device(s) 120 includes various computing devices with client program 122 installed, that permit users to send messages to messaging server 110. Messaging program 112 in response to the received messages distributes the messages to the intended or relevant recipients. While the following provides illustrative examples where messaging program 112 maintains a chat room, one of ordinary skill in the art will appreciate that embodiments of the present invention may be directed towards any communication platform regardless of the delivery and presentation of messages such as, but not limited to, direct messages, group messages, online forums, social networks or any platform or program that supports the sending or receiving of messages between users.

In various embodiments, messages analysis (MA) program 132 monitors and analyzes messages maintained by messaging program 112. As discussed herein, MA program 132 analyzes the content of messages maintained by messaging program 112 to determine the topics. Furthermore, MA program 132 determines, of those topics, which topics are primary topics and which are secondary topics related to the ongoing discussion. Primary topics are topics, subjects or content provided in the messages that indicate frequently discussed topics with a domain or channel maintained by messaging server 110. Secondary topics are topics which are less frequently mentioned or discussed within a particular domain or channel maintained by messaging server 110.

In various embodiments, MA program 132 retrieves, either in real-time (e.g., as messages are delivered and distributed by messaging server 110) or at a later time after delivery, messages posted by users to messaging server 110 as message data 136. Based on the messages retrieved and stored in message data 136, MA program 132 determines one or more topics discussed in message data 136. For example, MA program 132 determines topics in message data 136 based on topic modeling. Topic modeling generates various word clusters or groups of words that are found to be proximal to other words. Based on the frequency or rate that certain words appear in conjunction with other words within message data 136, MA program 132 determines one or more topics discussed in message data 136. As another example for determining topics in message data 136, MA program 132 performs Latent Dirichlet Allocation (LDA) to determine the topics discussed in message data 136. LDA is a natural language processing (NLP) model which creates a hierarchical data structure that represents various layers or components of collections of text, such as message data 136. LDA separates text into three categories, words, documents and corpus. LDA then assumes various distributions of topics within each tier (e.g., words or snippets contain one topic, documents contain a few topics and corpora contain many topics). Regarding the tiers of message data 136, MA program 132 each message as a document and the channel or domain which the messages are posted to as the corpus.

Returning to the LDA model, MA program 132 initially assumes a number of topics per each message (e.g., one or two). MA program 132 then randomly assigns each word or group of words in the message a topic. For an initial list of topics, MA program 132 performs topic modeling as discussed herein. Based on this initial assignment, MA program 132 randomly selects various words and removes the assigned topic from that grouping. MA program 132 then recalculates the distribution of topics per word, document and corpora. Once a desired number of iterations has occurred of removing and recalculating topic distribution, MA program 132 identifies a distribution of topics within message data 136.

In various embodiments, MA program 132 retrieves collaborative data 134 from messaging server 110. Collaborative data 134 is a data structure that indicates the various relationships and memberships (e.g., channels joined in a chat messaging platform or users followed in a social network platform) of members or participants in messaging program 112. In some scenarios, MA programs 132 creates separate corpora or documents for topic identification based on collaborative data 134. For example, MA program 132 may determine topics based on messages from channel moderators or owners or may weigh topics may heavily from this type of user.

In various embodiments, MA program 132 determines a likelihood that a word or sentence in message data 136 is addressing or otherwise discusses a primary topic. Primary topics are topics that are frequently discussed within message data 136. For other topics, MA program 132 designates the topics as secondary topics. While at a point in time a topic is deemed secondary, message data 136 is ever changing. As such, MA program 132 constantly reevaluates message data 136 to determine if secondary topics later become more prevalent and therefore primary topics.

For each word parsed from message data 136, MA program 132 determines two distances (i) a cosine similarity distance and (ii) a geodesic distance. For a determination of cosine similarity distance between words in message data 136, MA program 132 creates a multi-dimensional space, where each dimension is orthogonal and represent each word. The values for each dimension are the number of instances the word is mentioned in message data. Each document, as the term is discussed in reference to LDA, is then mapped to the multi-dimensional space with a count of each word being vectors within the space. As stated above, MA program 132 in some embodiments, may digest entire messages as "documents" in an LDA model. In other scenarios, sentences or partial sentences may be "documents" in an LDA model. In various embodiments, MA program 132 compares the similarity of two messages based on the cosine distance when comparing two mapped documents or messages. Cosine distance is the cosine angle between two vectors or mapped messages.

For a determination of geodesic distance between words in message data 136, MA program 132 creates a connected path model where each node in the model corresponds to a word in a message. MA program 132 then connects each word in the message if they are semantically related. For example, semantic relations, such as verbs and adverbs, connect various subject nodes in the connected path model. Based on the shortest path distance between nodes, such as determined by Dijkstra's Algorithm, MA program 132 determines a geodesic distance between messages.

In some embodiments, MA program 132 determines a collaborative distance based on collaborative data 134. Collaborative distance is a measure of how closely two or more members in messaging program 112 are related. In some scenarios, MA program 112 analyzes message data 136 to determine users who frequently communicate with one another, with MA program 112 assigning a shorter collaborative distance to those who frequently interact with one another. In other scenarios, MA program 132 analyzes collaborative data 134, which includes data indicative of member roles and other business relationships, to determine how closely two chat members are to each other within a organizations structure. For example, co-workers or members with similar roles would be assigned a shorter collaborative distance when compared to members from different departments or roles.

In various embodiments, MA program 132 determines a likelihood that the distances indicate two or more messages are similar and address the same topic. As the cosine similarity distance, geodesic distance and/or collaborative distance become shorter, the more likely the messages are to be about the same topic. For each distance type (i.e., cosine, geodesic and collaborative), MA program 132 determines a likelihood probability that each distance indicates similar messages. MA program 132 combines both probability as a product of probabilities, thereby leveraging both models for increased accuracy.

Based on the determined probabilities, MA program 132 determines a threshold value which indicates if the topics in the message are primary topics or secondary topics. In various embodiments, MA program 132 combines the likelihoods by multiplying both values. In other embodiments, MA program 132 performs Bayesian inference to determine the likelihood or probability that both likelihoods from cosine and geodesic determinations indicate that the message is directed towards a primary target via the chain rule which is the probability or likelihood both likelihoods, or joint likelihood, indicate a primary topic is being discussed. One of ordinary skill in the art will appreciate that the likelihoods of both the cosine similarity distance and the geodesic distance indicate a primary topic is present in message data 136. Based on the tuned likelihoods, distances and determined threshold values, MA program 132 creates and maintains chat utterance region model (CURM) data 138.

In some embodiments, CURM data 138 includes a dimension for each distance to be evaluated. For a single dimension, the threshold for determining likelihood in CURM data 138 is a distance cutoff value, where shorter distances below the cutoff value correspond to higher likelihoods. In some embodiments, more than one distance or dimension may be monitored in CURM data 138. In a multi-dimensional model, each distance may have different cutoff values. In such cases, CURM data 138 includes primary and secondary topic cutoff regions, with the regions determined by the various threshold values MA program 132 determines for each type of distance.

Figure 3:
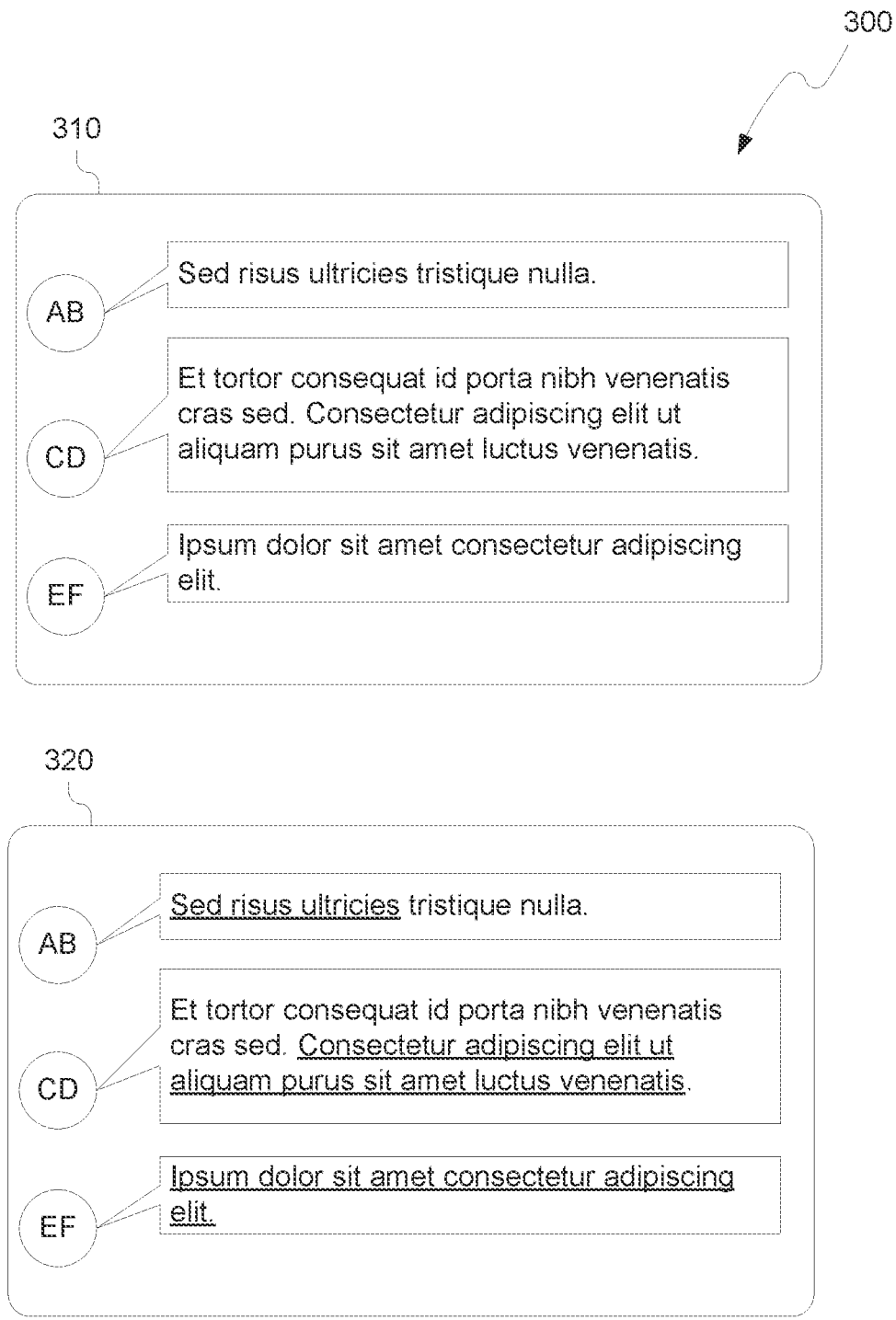
FIG. 3 illustrates an example diagram depicting identification of primary topics in text.

In some embodiments, when MA program 132 determines that a message is likely directed towards a primary topic then MA program 132 updates message data 136 to provide an indication of which messages include are primary topics. Referring to FIG. 3, which includes an example diagram 300 that depicts identification of primary topics in text, initial message data set 310 depicts an initial series of messages provided by three participants. Primary topic markup message data set 320 illustrates MA program 132 updated message data 136 to indicate the sentences or words of message data 136 that are related to a primary topic, which are depicted as an underline. One of ordinary skill in the art will appreciate that MA program 136 may alter, change of provided some indication in relation to message data 136 in a variety of manners without deviating from the invention.

In some embodiments, MA program 132 deploys or otherwise instructs chat agent (CA) module 133 to post, converse or otherwise send new messages to messaging program 112. In one scenario, CA module 133 posts recaps or summaries of primary topics to messaging program 112 in order to keep participants aware of ongoing important or primary topics. In another scenario, CA module 133 includes features and routines to interact with participants of messaging program 112 as an assistant or questions-and-answer bot. In such instances, CA module 133 is provided primary topics or corresponding text of messages to train with relevant corpora and use cases to aid in generating response to questions or to converse with other participants in messaging program 112.

Figure 2A:
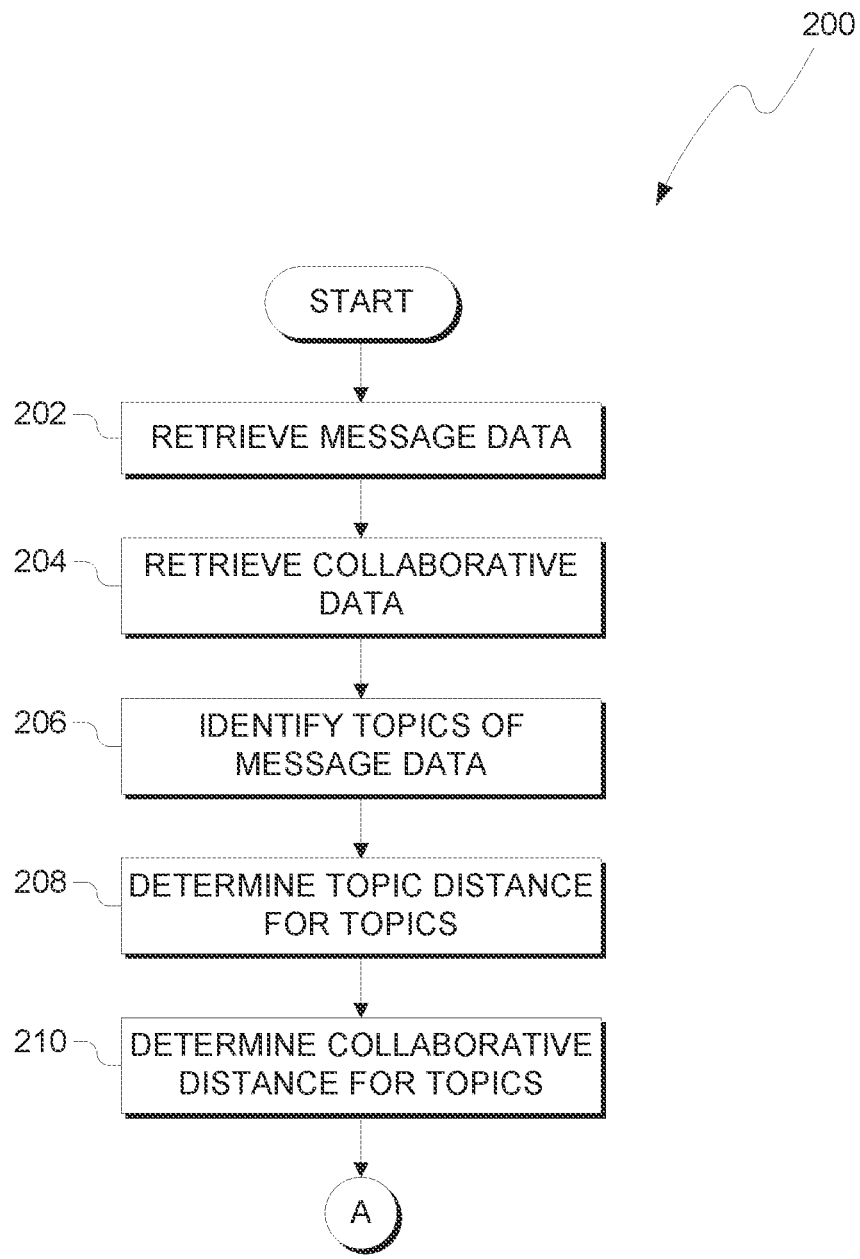
FIGS. 2A-B illustrate operational processes of message analysis program, on a computing device within the environment of FIG. 1, in accordance with an exemplary embodiment of the present invention.
Figure 2B:
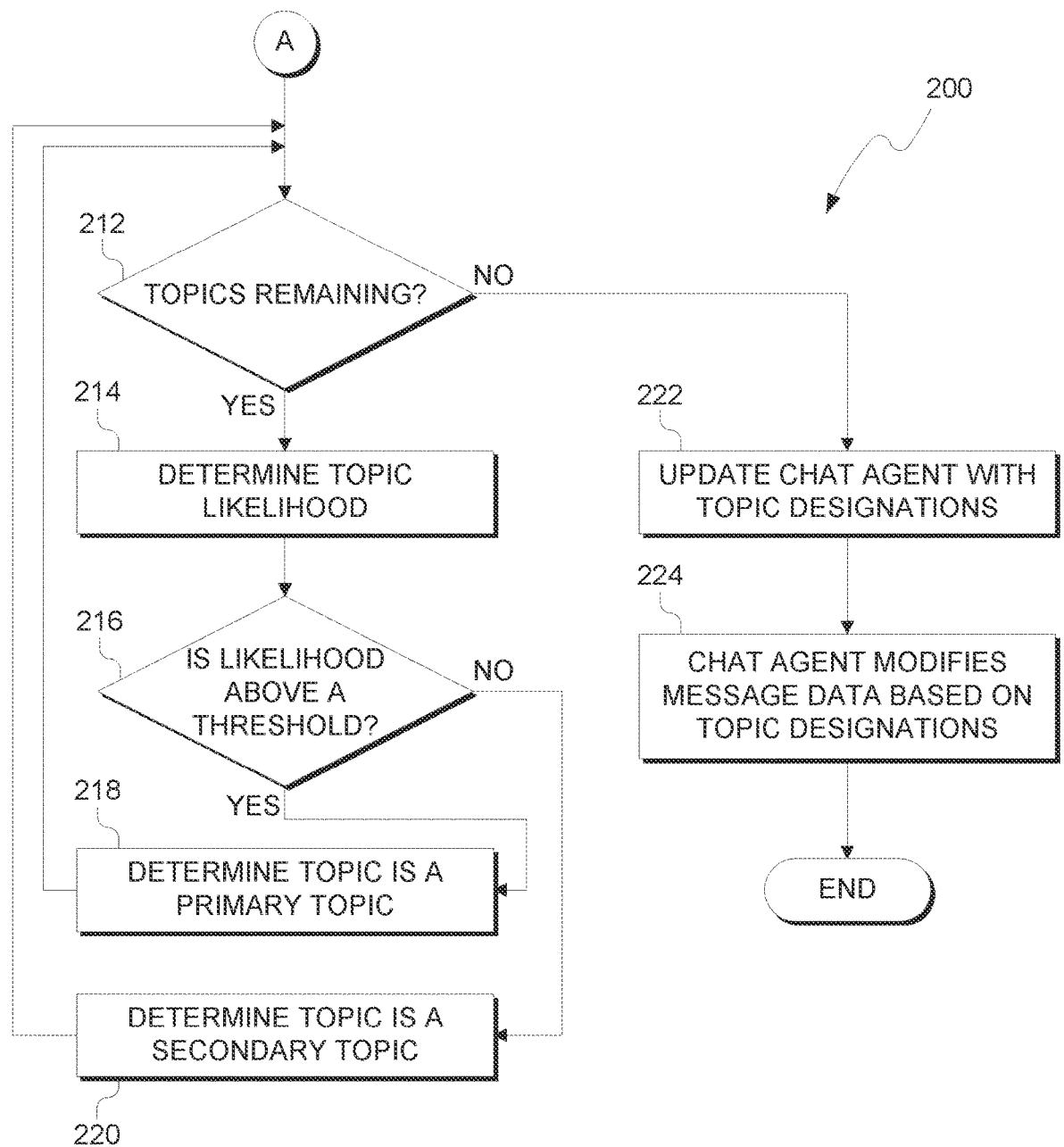

FIGS. 2A-2B illustrates operational processes, generally designated 200, MA program 132. In process 202, MA program 132 retrieves message data 136 from a messaging platform or service such as messaging program 112. Message data 136 includes any posts, indirect messages, direct messages, or any other text-based content shared via users of messaging program 112. In some scenarios, message data 136 may also include text of verbal messages that are machine-transcribed.

In process 204, MA program 132 retrieves collaborative data 134. Collaborative data 134 indicates the relationships and responsibility or titles of participants. For example, collaborative data 134 may indicate an organizational hierarchy and occupational responsibilities or titles of participants. As another example, collaborative data 134 may indicate owners, operators, administrators or moderators of a room or channel maintained by messaging program 112.

In process 206, MA program 132 identifies topics in message data 136. In some scenarios, MA program 132 deploys topic modeling to determine the topics discussed in message data 136. In other scenarios, MA program 132 utilizes a LDA model to determines topics discussed in message data 136. In process 208, MA program 132 determines a topic distance for each topic. In some scenarios, the topic distance is the cosine similarity of messages with the topics identified in process 206. Cosine similarity is an angular distance between two points in a multidimensional space, with each dimension relating to a word or topic contained in message data 136. In other scenarios, MA program 132 determines the geodesic distance between topics. MA program 132 creates a connected path model for each message. The nodes of the connected path model are the words or topics discussed in the message. The paths or edges are relationships between the topics or words in the message. Words or topics that require more paths to traverse to reach one another are further than those will fewer paths required to traverse. Furthermore, in additional scenarios, MA program 132 may combine both cosine similarity and geodesic distances into a single metric.

In process 210, MA program 132 determines a collaborative distance between users discussing a topic. For topics with more closely related users discussing said topic, MA program 132 assigns a smaller distance. For example, a topic is repeated among co-workers or those with similar job responsibilities or titles. For topics discussed among related users, MA program 132 assigns a shorter collaborative distance. Conversely for another topic discussed by unrelated or dissimilar users, MA program 132 assigns a greater collaborative distance, meaning the users a less likely to be collaborating on work and are discussing generalized topics. In another example, MA program 132 looks at a user's role or position to determine a collaborative distance. For example, MA program 132 assigns shorter collaborative distances to topics discussed by managers of an organization or moderators of the channel, since this type of user may be providing a more instructive or guiding task in the overall discourse of the channel or room.

In processes 212-220, MA program 132 analyzes each topic identified in process 206 to determine a topic likelihood for each topic, indicating if the topic is likely a primary topic or a secondary topic. For each topic (decision process 212), MA program 132 determines a topic likelihood. For the cosine, geodesic and collaborative distances, MA program 132 determines a likelihood probability that the distance indicates a primary topic (Process 214). Then, MA program 132 combines both the cosine distance and the geodesic distance likelihoods to determine an overall likelihood that the topic is directed to a primary topic. In some embodiments, MA program 112 also includes a collaborative distance when determining a likelihood of a primary topic.

MA program 132 compares the combined likelihood to a threshold value (decision process 216). If the combined likelihood exceeds the threshold value (YES, decision process 216), then MA program 132 designates the topic as a primary topic (process 218). If the combined likelihood does not exceed the threshold value (NO, decision process 216), then MA program 132 designates the topic as a primary topic (process 220). Once all topics have been classified as either primary or secondary topics (NO, decision process 212), then MA program 132 updates CA module 133 with the determined classifications (Process 222). In process 224, CA module 133 modifies message data 136 to indicate the designation. Looking back to FIG. 3, Primary topic markup message data set 320 illustrates MA program 132 updated message data 136 to indicate the sentences or words of message data 136 that are related to a primary topic, which are depicted as an underline. In primary topic markup message data set 320, MA program 132 highlights or otherwise emphasizes message data 136 that is related to a primary topic.

In some scenarios, CA module 133 is trained or provided primary topics to assist in interacting with users of messaging program 112. For example, CA module 133 is a question and answer bot that answers user-submitted questions posted to a channel or forum (i.e., as message data 136). In this example, CA Module 133 may be instructed to only address questions directed towards the primary topic. As discussed above, MA program 112 determines the content of each message posted to message data 136. When MA program 112 detects a question directed towards a primary topic, MA program 112 instructs CA module 133 to respond. If the topic is a secondary topic, then MA program 112 instructs CA module 133 to not respond to the question or to alert the user that the question is not a primary topic of the channel and provide links or information for other assistance.

In another example, CA module 133 provides a summary of the current or more recent messages in message data 136. In this example, CA Module 133 provides summaries for primary topics found in message data 136, while not summarizing secondary topics. One of ordinary skill in the art will appreciate that CA module 133 can be programmed and improved by identifying primary topics in message data 136 in a variety of manners without deviating from the invention. By supplying a chat agent with primary topics, embodiments of the invention improve to operation of chat agents or bots by focusing the discourse and discussion of the chat agent to the most relevant topics of the chat room or channel.

Figure 4:
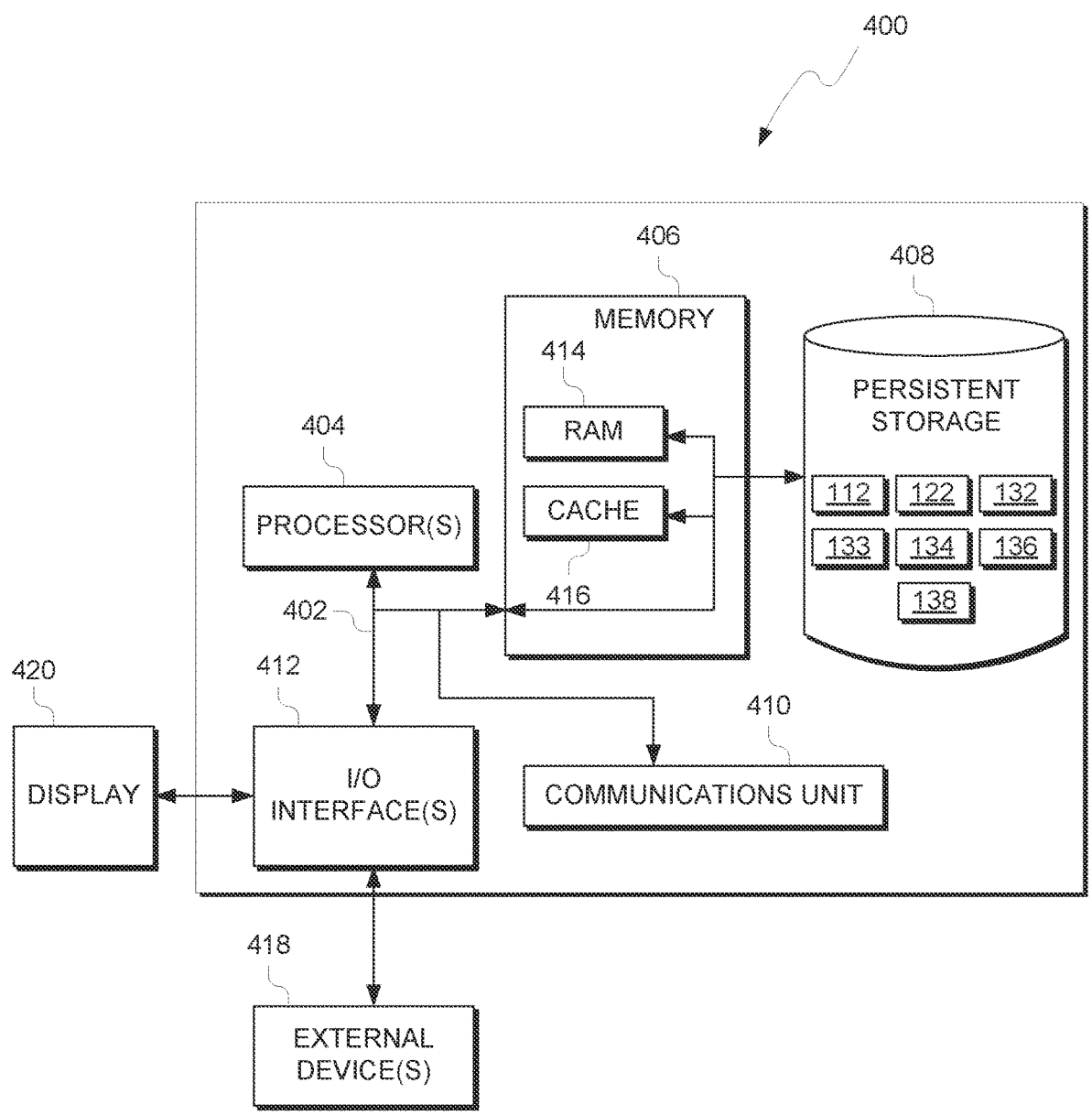
FIG. 4 depicts a block diagram of components of the computing device executing message analysis program, in accordance with an exemplary embodiment of the present invention.

FIG. 4 depicts a block diagram, 400, of components of messaging server 110, user device(s) 120 and computing device 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Messaging server 110, user device(s) 120 and computing device 130, either individually or collectively, each includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Messaging program 112, client program 122, MA program 132, CA module 133, collaborative data 134, message data 136 and CURM data 138 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 140. In these examples, communications unit 410 includes one or more network interface cards. Communications unit 410 may provide communications through the use of either or both physical and wireless communications links. Messaging program 112, client program 122, MA program 132, CA module 133, collaborative data 134, message data 136 and CURM data 138 may be downloaded to persistent storage 408 through communications unit 410.

I/O interface(s) 412 allows for input and output of data with other devices that may be connected to Messaging server 110, user device(s) 120 or computing device 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., messaging program 112, client program 122, MA program 132, CA module 133, collaborative data 134, message data 136 and CURM data 138, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method for directing a chat agent for an online discussion, the method comprising:
retrieving message data and collaborative data from a messaging program;
identifying a plurality of topics present in the message data using topic modeling;
determining a respective topic distance for each of the plurality of the topics present in the message data, wherein the respective topic distance for each of the plurality of the topics is a geodesic distance between two or more messages directed towards a respective topic and a cosine similarity of the two or more messages;
determining a collaborative distance between two or more participants discussing a respective topic for each of the plurality of the topics, wherein the collaborative distance is based on a role assigned to at least one participant in the message data and a frequency of communication between the two or more participants;
analyzing each of the plurality of the topics to determine one or more likelihood probabilities that indicate whether a respective topic is a primary topic or a secondary topic based on the collaborative distances and the respective topic distances for each of the plurality of the topics;
combining each of the plurality of the topic's respective one or more likelihood probabilities to calculate a combined likelihood for each of the plurality of the topics;

comparing each of the plurality of the topic's combined likelihood to a determined threshold value to determine if a respective topic is a primary topic or a secondary topic; and modifying the message data to designate each of the plurality of the topics as a primary topic or a secondary topic.

2. The computer-implemented method of claim 1, wherein modifying message data further comprises:

highlighting, by one or more processors, text within the message data that is related to the primary topic.

3. The computer-implemented method of claim 1, wherein modifying message data further comprises:

responding, by one or more processors, to a new message directed towards the primary topic.

4. The computer-implemented method of claim 1, wherein modifying message data further comprises:

summarizing, by one or more processors, message data directed towards the primary topic.

5. The computer-implemented method of claim 1, further comprising:

training the chat agent to assist in interacting with participants of the messaging program using previously determined primary topics and secondary topics;

determining content of each message in the message data; and processing a participant-submitted question and the determined content of each of the messages through the trained chat agent to assist in an interaction between two or more participants of the online messaging program.

6. The computer-implemented method of claim 5, further comprising:

processing each of the messages in the message data through the trained chat agent to summarize each of the messages.

7. A computer program product for directing a chat agent for an online discussion, the computer program product comprising:

one or more computer-readable storage media and program instructions stored on the one or more computer-readable storage media, the program instructions comprising:

program instructions to retrieve message data and collaborative data from a messaging program;

program instructions to identify a plurality of topics present in the message data using topic modeling;

program instructions to determine a respective topic distance for each of the plurality of the topics present in the message data, wherein the respective topic distance for each of the plurality of the topics is a geodesic distance between two or more messages directed towards a respective topic and a cosine similarity of the two or more messages;

program instructions to determine a collaborative distance between two or more participants discussing a respective topic for each of the plurality of the topics, wherein the collaborative distance is based on a role assigned to at least one participant in the message data and a frequency of communication between the two or more participants;

program instructions to analyze each of the plurality of the topics to determine one or more likelihood probabilities that indicate whether a respective topic is a primary topic or a secondary topic based on the collaborative distances and the respective topic distances for each of the plurality of the topics;

program instructions to combine each of the plurality of the topic's respective one or more likelihood probabilities to calculate a combined likelihood for each of the plurality of the topics;

program instructions to compare each of the plurality of the topic's combined likelihood to a determined threshold value to determine if a respective topic is a primary topic or a secondary topic; and program instructions to modify the message data to designate each of the plurality of the topics as a primary topic or a secondary topic.

8. The computer program product of claim 7, wherein program instructions to modify message data further comprises:

program instructions to highlight text within the message data that is related to the primary topic.

9. The computer program product of claim 7, wherein program instructions to modify message data further comprises:

program instructions to respond to a new message directed towards the primary topic.

10. The computer program product of claim 7, wherein program instructions to modify message data further comprises:

program instructions to summarize message data directed towards the primary topic.

11. The computer program product of claim 7, further comprising:

program instructions to train the chat agent to assist in interacting with participants of the messaging program using previously determined primary topics and secondary topics;

program instructions to determine content of each message in the message data; and program instructions process a participant-submitted question and the determined content of each of the messages through the trained chat agent to assist in an interaction between two or more participants of the online messaging program.

12. The computer program product of claim 11, further comprising:

program instructions to process each of the messages in the message data through the trained chat agent to summarize each of the messages.

13. A computer system for directing a chat agent for an online discussion, the computer system comprising:

one or more computer processors;

one or more computer readable storage media; and program instructions stored on the computer readable storage media for execution by at least one of the one or more processors, the program instructions comprising:

program instructions to retrieve message data and collaborative data from a messaging program;

program instructions to identify a plurality of topics present in the message data using topic modeling;

program instructions to determine a respective topic distance for each of the plurality of the topics present in the message data, wherein the respective topic distance for each of the plurality of the topics is a geodesic distance between two or more messages directed towards a respective topic and a cosine similarity of the two or more messages;

program instructions to determine a collaborative distance between two or more participants discussing a respective topic for each of the plurality of the topics, wherein the collaborative distance is based on a role assigned to at least one participant in the message data and a frequency of communication between the two or more participants;

program instructions to analyze each of the plurality of the topics to determine one or more likelihood probabilities that indicate whether a respective topic is a primary topic or a secondary topic based on the collaborative distances and the respective topic distances for each of the plurality of the topics;

program instructions to combine each of the plurality of the topic's respective one or more likelihood probabilities to calculate a combined likelihood for each of the plurality of the topics;

program instructions to compare each of the plurality of the topic's combined likelihood to a determined threshold value to determine if a respective topic is a primary topic or a secondary topic; and program instructions to modify the message data to designate each of the plurality of the topics as a primary topic or a secondary topic.

14. The computer system of claim 13, wherein program instructions to modify message data further comprises:

program instructions to highlight text within the message data that is related to the primary topic.

15. The computer system of claim 13, wherein program instructions to modify message data further comprises:

program instructions to respond to a new message directed towards the primary topic.

16. The computer system of claim 13, wherein program instructions to modify message data further comprises:

program instructions to summarize message data directed towards the primary topic.

17. The computer system of claim 13, further comprising:

program instructions to train the chat agent to assist in interacting with participants of the messaging program using previously determined primary topics and secondary topics;

program instructions to determine content of each message in the message data; and program instructions process a participant-submitted question and the determined content of each of the messages through the trained chat agent to assist in an interaction between two or more participants of the online messaging program.

18. The computer system of claim 17, further comprising:

program instructions to process each of the messages in the message data through the trained chat agent to summarize each of the messages.

* * * * *